US007894387B2

(12) United States Patent
Paryani

(10) Patent No.: US 7,894,387 B2
(45) Date of Patent: *Feb. 22, 2011

(54) SYSTEM AND METHOD FOR ACCESSING A MULTI-LINE GATEWAY USING CORDLESS TELEPHONY TERMINALS

(75) Inventor: Harish Paryani, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1456 days.

This patent is subject to a terminal disclaimer.

(21) Appl. No.: 11/230,139

(22) Filed: Sep. 19, 2005

(65) Prior Publication Data

US 2006/0013164 A1 Jan. 19, 2006

Related U.S. Application Data

(63) Continuation of application No. 09/919,670, filed on Jul. 31, 2001, now Pat. No. 6,973,058.

(51) Int. Cl.
*H04W 4/00* (2009.01)
(52) U.S. Cl. .................................. 370/329; 370/401
(58) Field of Classification Search .................. None
See application file for complete search history.

(56) References Cited

U.S. PATENT DOCUMENTS

| | | | | |
|---|---|---|---|---|
| 5,841,986 | A * | 11/1998 | Scherwey | 709/236 |
| 6,226,279 | B1 * | 5/2001 | Hansson et al. | 370/329 |
| 6,292,496 | B1 * | 9/2001 | Rasanen | 370/503 |
| 2001/0006512 | A1 * | 7/2001 | Takabatake et al. | 370/329 |
| 2001/0022784 | A1 * | 9/2001 | Menon et al. | 370/352 |
| 2007/0127391 | A1 * | 6/2007 | Goodman | 370/252 |
| 2008/0144545 | A1 * | 6/2008 | Stanwood et al. | 370/295 |

* cited by examiner

*Primary Examiner*—Jayanti K Patel
*Assistant Examiner*—Anthony Sol
(74) *Attorney, Agent, or Firm*—McAndrews, Held & Malloy, Ltd.

(57) ABSTRACT

According to the present invention, simultaneous call-handling and data transfer is achieved between a terminal and a multi-line gateway in a cordless telephony environment. Multiple logical channels are established and used as signaling resources for calls on the multiple lines, and also for data transfers between the gateway and terminal. As a result, terminals can handle multiple calls on different lines and at the same time access data stored at the gateway. According to a first aspect of the present invention, two or more logical channels are established over an asynchronous channel between a terminal and a gateway. These logical channels are assigned to calls that are set-up between the terminal and gateway. When used as a signaling resource, the logical channels allow the terminal to distinguish between signaling information for multiple simultaneous calls. The calls are associated with another speech or data channel that will bear the voice signal, referred to herein as a bearer channel. According to a second aspect of the present invention, a logical channel is also established over an asynchronous channel to handle data transfers between the gateway and terminal. Using this logical channel, the terminal can access data stored at the gateway without disrupting any ongoing calls.

17 Claims, 6 Drawing Sheets

SYSTEM AND METHOD FOR ACCESSING A MULTI-LINE GATEWAY USING CORDLESS TELEPHONY TERMINALS

CROSS-REFERENCE TO RELATED APPLICATIONS

This application is a continuation of U.S. application Ser. No. 09/919,670 filed Jul. 31, 2001 now U.S. Pat. No. 6,973,058.

BACKGROUND

1. Field of the Invention

The present invention relates generally to wireless communications, and more particularly to a system and method for accessing a multi-line gateway using cordless telephony terminals.

2. Discussion of the Related Art

In today's electronically interconnected world, the normal complement of electronic equipment in the home or business includes devices that are connected to one another in different ways. For example, many desktop computer systems have a central processing unit (CPU) connected to a mouse, a keyboard, a printer and so on. A personal digital assistant (PDA) will normally connect to the computer with a cable and a docking cradle. A television may be connected to a VCR and a cable box, with a remote control for all three components. A cordless phone connects to its base unit with radio waves, and it may have a headset that connects to the phone with a wire. In a stereo system, a CD player, tape player and record player connect to a receiver, which connects to speakers. These connections can be difficult to install and maintain, particularly for the lay user.

Alternatives to these conventional approaches to connectivity have been proposed. Bluetooth™ (BT) is a computing and telecommunications industry specification for connectivity that is both wireless and automatic, as described in *The Specification of the Bluetooth System*, Version 1.1, Feb. 22, 2001, ("the BT specification"), which is incorporated herein by reference. BT allows any sort of electronic equipment—from computers and cell phones to keyboards and headphones—to make its own connections, without wires, cables or any direct action from a user. Because BT connections are wireless, offices can be designed without regard to cable placement and users can travel with portable devices without having to worry about carrying a multitude of cables. These connections can be established automatically, where BT devices find one another and form a connection without any user input at all.

BT requires that a low-cost microchip transceiver be included in each device. The BT microchip transceiver communicates on a frequency of 2.45 GHz, which has been set aside by international agreement for the use of industrial, scientific and medical devices (ISM). In addition to data, up to three voice channels are available. Each BT device has a unique 48-bit device address from the Institute of Electrical and Electronics Engineers 802 standard. Connections can be point-to-point or multi-point. Data can be exchanged at a rate of 1 megabit per second (up to 2 Mbps in the second generation of the technology).

A number of common consumer devices also take advantage of the same radio frequency (RF) band. Baby monitors, garage-door openers and some cordless phones all make use of frequencies in the ISM band. The BT design employs various techniques to reduce interference between these devices and BT transmissions. For example, BT avoids interfering with other systems by sending out relatively weak signals of 1 milliwatt. By comparison, some cell phones can transmit a signal of 3 watts. The low power limits the range of a BT device to about 10 meters, thereby reducing the probability of interference with other devices.

BT also employs a spread-spectrum frequency hopping scheme to further reduce interference and increase capacity. BT devices use 79 randomly chosen frequencies within a designated range, changing from one to another on a regular basis 1,600 times every second. The random frequency hopping pattern makes it unlikely that two BT transmitters will be on the same frequency at the same time, thus reducing the probably of BT devices interfering with one another. This technique also minimizes the risk that other non-BT devices such as portable phones or baby monitors will disrupt BT devices since any interference on a particular frequency will last only a fraction of a second.

When BT devices come within range of one another, an electronic conversation takes place to determine whether they have data to share or whether one needs to control he other. Once the conversation has occurred, the devices form a "piconet". A piconet ay link devices located throughout a room, such as a home entertainment system, or devices much closer together such as a mobile phone on a belt-clip and a headset, or a computer, mouse, and printer. Once a piconet is established, the connected devices randomly hop frequencies in unison to communicate with one another and avoid other piconets that may be operating nearby.

One device acts as the master of the piconet, whereas the other unit(s) acts as slave(s). Up to seven slaves can be active in a single piconet. The slaves synchronize to the master's timing, and access to the channel is controlled by the master. The channel is represented by a pseudo-random hopping sequence hopping through the 79 RF channels. The hopping sequence is unique for each piconet and is determined by the BT device address of the master, the phase in the hopping sequence is determined by the BT clock of the master. The channel is divided into time slots where each slot corresponds to an RF hop frequency. Consecutive hops correspond to different RF hop frequencies. The nominal hop rate is 1,600 hops/second. All BT devices participating in the piconet are time- and hop-synchronized to the channel.

Between master and slave(s), different types of links can be established. Two link types have been defined in the BT specifications: Synchronous Connection-Oriented (SCO) links, and Asynchronous Connection-Less (ACL) links. The SCO link is a point-to-point link between a master and a single slave in the piconet. SCO links support real-time voice traffic using reserved bandwidth. The ACL link, by comparison, is a point-to-multipoint link between the master and all the slaves participating on the piconet. In the slots not reserved for SCO links, the master can exchange packets with any slave on a per-slot basis. The ACL link provides a packet-switched connection between the master and all active slaves participating in the piconet.

Data on the piconet channel is conveyed in packets. Each packet consists of three entities: the access code, the header, and the payload. The access code and header are of fixed size: 72 bits and 54 bits respectively. The payload can range from zero to a maximum of 2745 bits. Packets may include the access code only, the access code header, or the access code header payload. In an ACL link, the master can either broadcast packets to every slave in the piconet, or send packets to a particular slave. ACL packets not addressed to a specific slave are considered as broadcast packets and are read by all the slaves. In the reverse direction, the master controls slave access to the channel.

As mentioned above, BT wireless techniques can be applied to a number of environments. One such environment is cordless telephony. The Cordless Telephony Profile (CTP) portion of the BT specification, for example, describes a "3-in-1 phone" wherein an extra BT mode of operation is provided to cellular phones. The 3-in-1 phone uses this BT mode as a short-range bearer for accessing fixed network telephony services via a base station. The CTP describes various protocols for handling voice and data transmissions between the base station, referred to in the specification as a gateway, and a small number (maximum 7) of terminals. The gateway provides access to an external network, such as a public switched telephone network (PSTN). However, the techniques described in the CTP can also be applied generally for wireless telephony in a residential or small office environment, such as for cordless-only telephony or cordless telephony services in a personal computer (PC).

The CTP covers various scenarios, such as connecting to the gateway so that incoming calls can be routed to the terminal and outgoing calls can be originated, making a call from a terminal to a user on the external network, receiving a call from the external network, and making direct calls between two terminals. The CTP describes the gateway having a single line connecting the gateway to the external network. Procedures are described for handling calls received on this single line. This simple gateway will provide sufficient functionality for many environments, such as for personal use in a home having a single phone line.

However, many environments require that gateways support multiple lines coming from the external network. In this scenario, the terminals and gateway should be able to handle simultaneous calls on multiple lines. The CTP does not provide for this multi-line support. This limitation results, at least in part, from the terminal's inability to distinguish signaling information associated with calls that are occurring simultaneously. Signaling information is transmitted as packets of data As defined in the BT specification, these packets do not contain a field for identifying a particular call with which the packet is associated. This does not pose a problem when handling at most a single call at any given time, because the terminal assumes that all signaling information is associated with the single call. Problems arise, however, when packets associated with simultaneous calls arrive at the terminal. The packets do not identify themselves with a particular call, and the CTP does not describe using any other mechanism for making this association. The terminal is therefore unable to handle the signaling associated with multiple calls.

Furthermore, the CTP does not describe how terminals might access data stored at the gateway, nor does the CTP describe how data can be accessed while simultaneously handling a call. In many scenarios, data of interest to users could be stored by the gateway, such as phone book data, directories, and lists of phones calls made or received. Making this information available at the terminal requires that the stored data be transferred from the gateway to the terminal. The CTP does not describe procedures for accomplishing this transfer. There also could be situations where the user might wish to access this information during a call. For example, a user during a phone call might want to provide a phone number to another party on the call. It would be helpful if the user could access conveniently the stored phone book data using the terminal, and then read the desired number to the other party. The CTP does not describe how to access data while simultaneously handling a phone call.

What is needed therefore is an improved system and method for supporting calls on multiple lines in a cordless telephony environment. Further, there is also a need for an improved system and method for accessing data stored at the gateway, particularly where the access occurs during a call.

SUMMARY OF THE INVENTION

The present invention satisfies this need by providing a system and method for simultaneous call-handling and data transfer between a terminal and a multi-line gateway in a cordless telephony environment According to the present invention, multiple logical channels are established and used as signaling resources for calls on the multiple lines, and also for data transfers between the gateway and terminal. Utilizing the techniques described herein, a terminal can handle multiple calls on different lines and at the same time access data stored at the gateway.

According to a first aspect of the present invention, a plurality of logical channels are established over an asynchronous channel between a terminal and a gateway. These logical channels are assigned to calls that are set-up between the terminal and gateway. When used as a signaling resource, the logical channels allow the terminal to distinguish between signaling information for multiple simultaneous calls. The calls are associated with another speech or data channel that will bear the voice signal, referred to herein as a bearer channel. As each new call is set-up, an existing bearer channel can be used, or a new bearer channel can be created to carry the call. Synchronous point-to-point links can be used as bearer channels. Logical channels can also be used as bearer channels, where the voice signal is transmitted as packets of data according to "voice over IP" (VoIP) techniques.

According to a second aspect of the present invention, a logical channel is also established over an asynchronous channel to handle data transfers between the gateway and terminal. Using this logical channel, the terminal can access data stored at the gateway without disrupting any ongoing calls.

These and other aspects of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention provides a system and method for simultaneously handling calls on multiple lines and for transferring data between a terminal and a multi-line gateway in a cordless telephony environment. Generally speaking, according to the present invention multiple logical channels are established and used as signaling resources for calls on the multiple lines. Logical channels are also used for data transfers between the gateway and terminal. Utilizing the techniques described herein, a terminal can handle simultaneous calls on multiple lines and at the same time transfer data between the gateway and terminal.

Example embodiments of the present invention in many instances are described herein in the context of an example BT cordless telephony environment. These techniques are applied to the BT environment for illustrative purposes only, and should not be construed as limited to this environment. Rather, it will be apparent to those of skill in the relevant art that the principles described herein can also be applied to other similar cordless telephony environments.

As will be apparent to those skilled in the art, the present invention can include one or more computer programs which cause wireless devices to perform the functions described herein and illustrated in the appended flowcharts. However, it should also be apparent that there could be many different ways of implementing the invention in computer programming, or a combination of hardware and software, and the invention should not be construed as limited to any one set of computer program instructions. Further, a skilled programmer would be able to write such a computer program to implement the disclosed invention without difficulty based on the flowcharts and associated written description included herein. Therefore, disclosure of a particular set of program code instructions is not considered necessary for an adequate understanding of how to make and use the invention.

Figure 1:
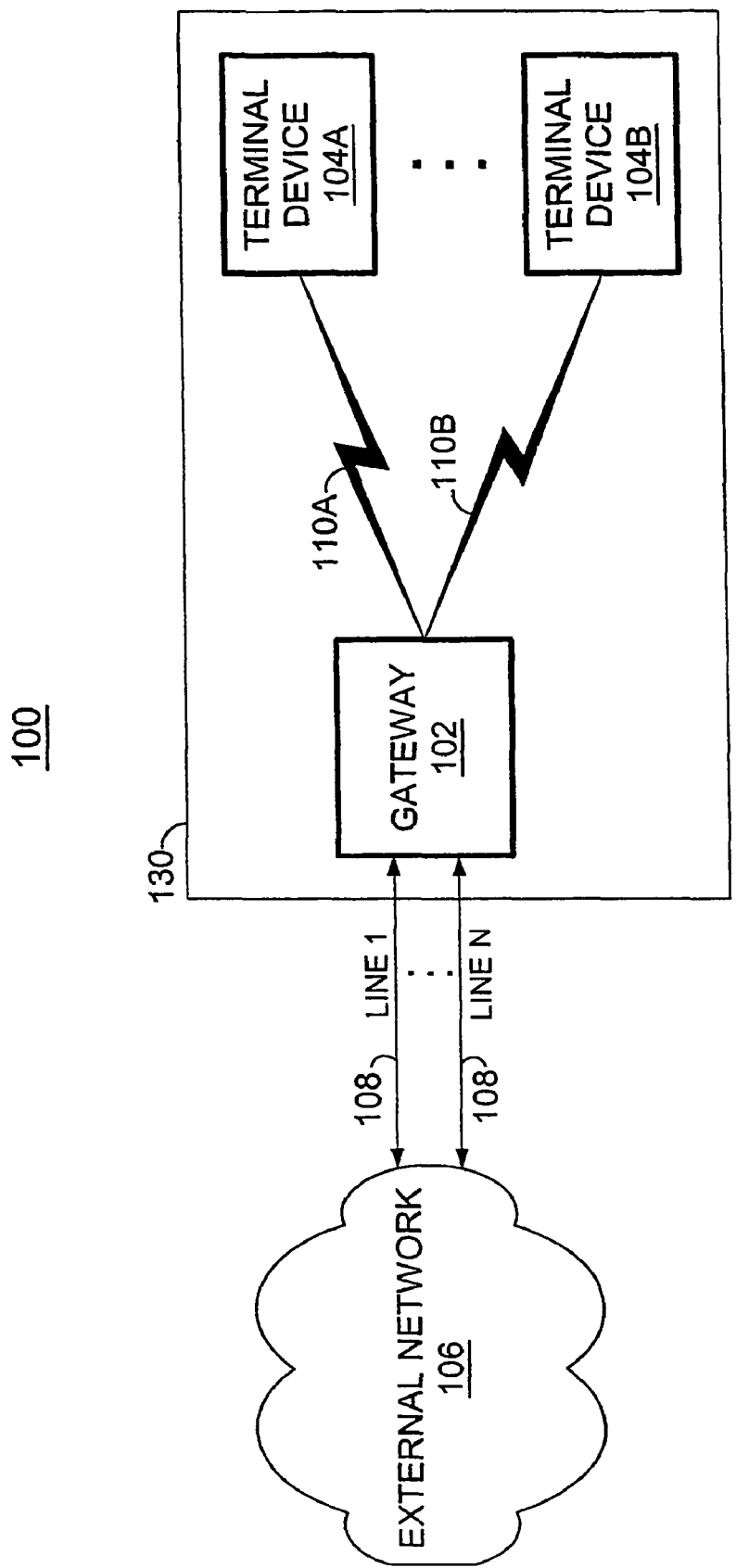
FIG. 1 depicts an example cordless telephony environment within which various example embodiments of the present invention operate.

FIG. 1 depicts an example cordless telephony environment 100 within which various example embodiments of the present invention operate. A gateway 102 communicates with one or more terminal devices 104 (shown as 104A and 104B). Wireless links 110 (shown as 110A and 110B) are established between gateway 102 and each of the terminal devices 104. Gateway 102 and terminal devices 104 together form a wireless network 130. In the example BT environment, wireless links 110 represent short-range RF links wherein the gateway and terminal devices communicate according to the protocols described in the BT specification. Further, wireless network 130 represents a piconet.

Gateway 102 is also connected to an external network 106 via one or more lines 108, where the number of lines is given by N. External network 106 can represent any network capable of carrying telephony information, such as a public switched telephone network (PSTN), the Internet and other wide area networks (WANs), cellular networks (terrestrial and satellite) such as the Global System for Mobile communications (GSM) networks, and various combinations of the above. Lines 108 represent the communication path over which telephony information travels between external network 106 and gateway 102. For example, lines 108 can represent land lines such as a standard 3-wire telephone line, an Integrated Services Digital Network (ISDN) line, or a high-speed connection to the Internet such as T1 or T3 lines. Lines 108 can also represent wireless connections, such as a terrestrial or satellite cellular connection. As used herein, each line 108 can carry a single call at any given time, though multiple calls can take place simultaneously on different lines 108.

Gateway 102 acts as a terminal endpoint from the point of view of network 106 and handles all interactions with network 106. Gateway 102 is the central point with respect to external calls, which means that it handles all call set-up requests to/from network 106. Gateway 102 can represent, for example, a PSTN home base station, an ISDN home base station, a GSM gateway, a satellite gateway and an H.323 (standard for transferring multimedia videoconferencing data over packet-switched networks, such as TCP/IP) gateway.

Terminal devices 104 represent wireless user terminals, such as a cordless telephone, a dual-mode cellular/cordless phone (e.g., a 3-in-1 phone) or a personal computer (PC). In general, terminal devices 104 can represent any electronic device that is equipped with a wireless transceiver, such as the Bluetooth™ Module (part number ROK 101 007) produced by Ericsson. Terminal devices 104 can, for example, represent a wide range of consumer electronic devices such as a laptop computer, PDA, cordless telephone, stereo equipment, television or VCR. Terminal devices 104 can represent identically or similarly configured devices, such as multiple cordless telephones used in conjunction with a single base station (gateway 102). Alternatively, terminal devices 104 can represent dissimilar devices, so long as each device is capable of communicating over wireless link 110 according to the techniques described herein.

In the example BT environment, gateway 102 and terminal devices 104 operate in conformance with the Telephony Control protocol Specification—Binary (TCS) portion of the BT specification as well as the CTP. The TCS protocol defines call control signaling for the establishment of speech and data calls between BT devices. The TCS protocol also defines mobility management procedures for handling BT TCS devices. The techniques described herein according to various example embodiments of the present invention in many cases extend the TCS and CTP protocols to provide additional functionality without violating the terms of the protocol.

Terminal devices 104 establish wireless links 110 upon coming within range of gateway 102. In the example BT environment described in the CTP, terminal devices 104 that are out of range of gateway 102 search for it by periodically trying to page the device address of the gateway. Gateway 102 devotes much of its free capacity (considering power limitations and ongoing signaling) to page scanning in order to allow roaming terminal devices 104 that enter the range of gateway 102 to find the gateway as quickly as possible. When terminal device 104 has successfully paged gateway 102 (making terminal device 104 temporarily the master), a master-slave switch is performed according to the BT specification so that gateway 102 becomes the piconet master. As master, gateway 102 controls the power mode of terminal devices 104 and may broadcast information to terminal devices 104.

The TCS and CTP protocols provide for the handling of calls on a single line 108. These protocols do not, however, describe how to handle simultaneous calls on multiple lines. Nor do these protocols describe how to transfer data between gateway 102 and terminal devices 104. Various example embodiments of the present invention will now be described for handling calls and data transfers for multi-line gateway 102.

Figure 2:
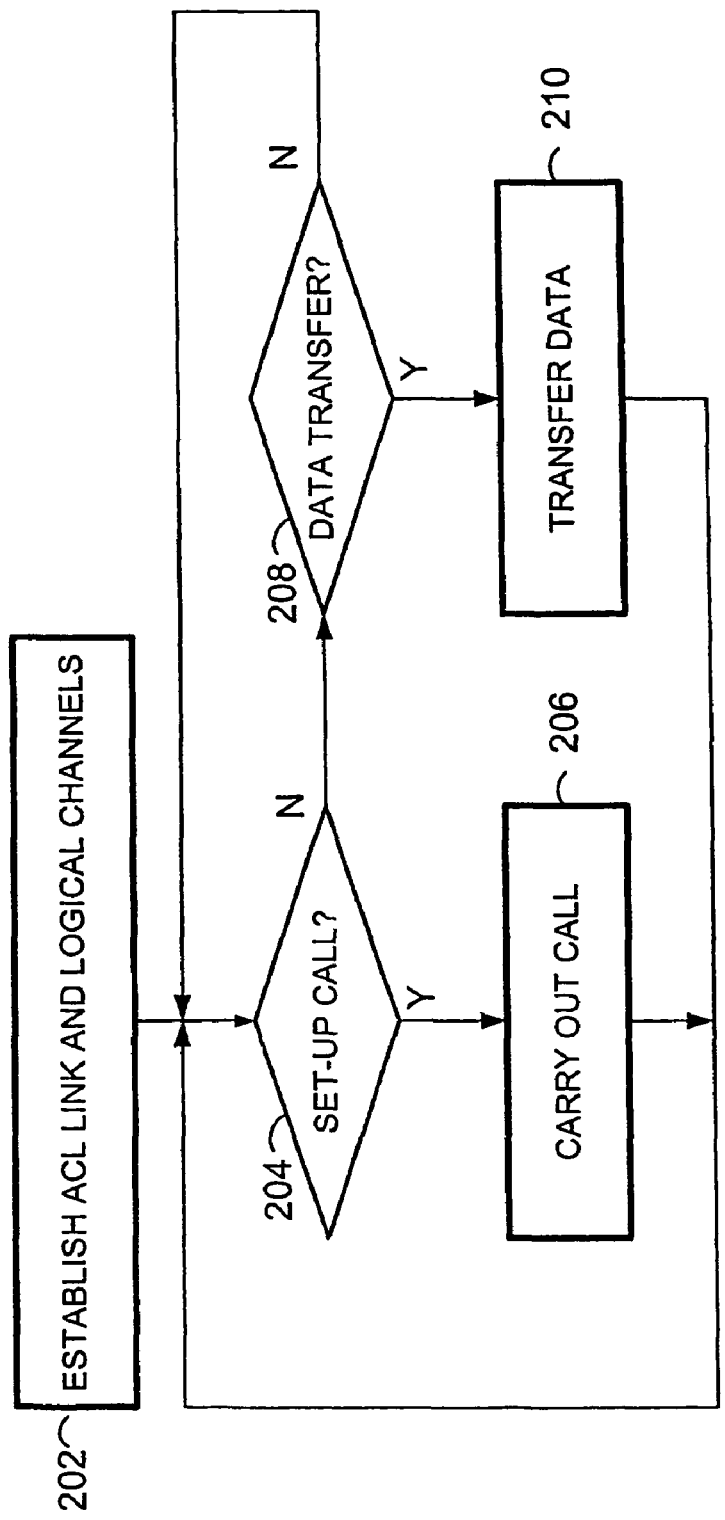
FIG. 2 depicts a flowchart that describes at a high level the operation of a gateway and one or more terminals within the cordless telephony environment according to an example embodiment of the present invention.

FIG. 2 depicts a flowchart 200 that describes at a high level the operation of gateway 102 and terminals 104 according to an example embodiment of the present invention. In operation 202, an asynchronous link is established between gateway 102 and terminal device 104, such as an ACL link in the example BT environment. The bandwidth associated with the ACL link is divided amongst logical channels that are multiplexed over the ACL link. One or more of these logical channels are established in operation 202.

According to an example embodiment of the present invention, operation 202 is performed when a terminal device 104 enters the range of gateway 102. By establishing the ACL link and logical channels at the outset, these resources are already available when needed to handle a call, thereby reducing the call set-up time. However, it will be apparent to those skilled in the art that the ACL link and logical channels could alternatively be established at a later time.

Operations 204 through 210 describe the behavior of gateway 102 and terminal devices 104 once the initial ACL link and logical channels have been established. As shown in operations 204 and 208, terminal devices 104 and gateway 102 wait for either a call set-up request or a data transfer request.

In operation 204, calls are set-up upon the arrival of an incoming call for one of the terminal devices 104, or when a terminal device 104 wants to make an outgoing call. If either of these events occurs, then in operation 206 the call is carried out. Each call must have associated with it a signaling channel and a bearer channel. TCS signaling information is exchanged over the signaling channel, whereas the voice signal is carried on the bearer channel. According to the present invention, the logical channels established in operation 202 are dynamically assigned to calls as they are set-up, where the logical channel acts as the signaling channel for the call. All of the signaling information for a particular call is therefore transmitted between gateway 102 and terminal device 104 over the assigned logical channel. The call is also associated with a bearer channel to carry the voice signal. An existing bearer channel can be used, or a new bearer channel might be created. Further, two or more calls can share a single bearer channel.

According to the present invention, terminal device 104 is able to distinguish the signaling information for simultaneous calls because the signaling information associated with each call is transmitted over a distinct logical channel. Packets transmitted over the ACL link via a particular logical channel are associated with the call to which the logical channel is assigned. Terminal device 104 can therefore differentiate between the signaling information associated with multiple simultaneous calls. As described in further detail below, this allows terminal device 104 to simultaneously handle calls on multiple lines 108.

In operation 208, if either gateway 102 or terminal device 104 request a data transfer from one device to the other, then in operation 210 the requested transfer is carried out. According to the present invention, a logical channel for handling these data transfers is established in operation 202. The data is transferred as packets assigned to the logical channel over the ACL link. The data transfer does not interfere with the handling of calls because different logical channels are used for the data transfer and for call signaling. Data can therefore be exchanged between gateway 102 and terminal device 104 while at the same time handling simultaneous calls on multiple lines 108.

Figure 3:
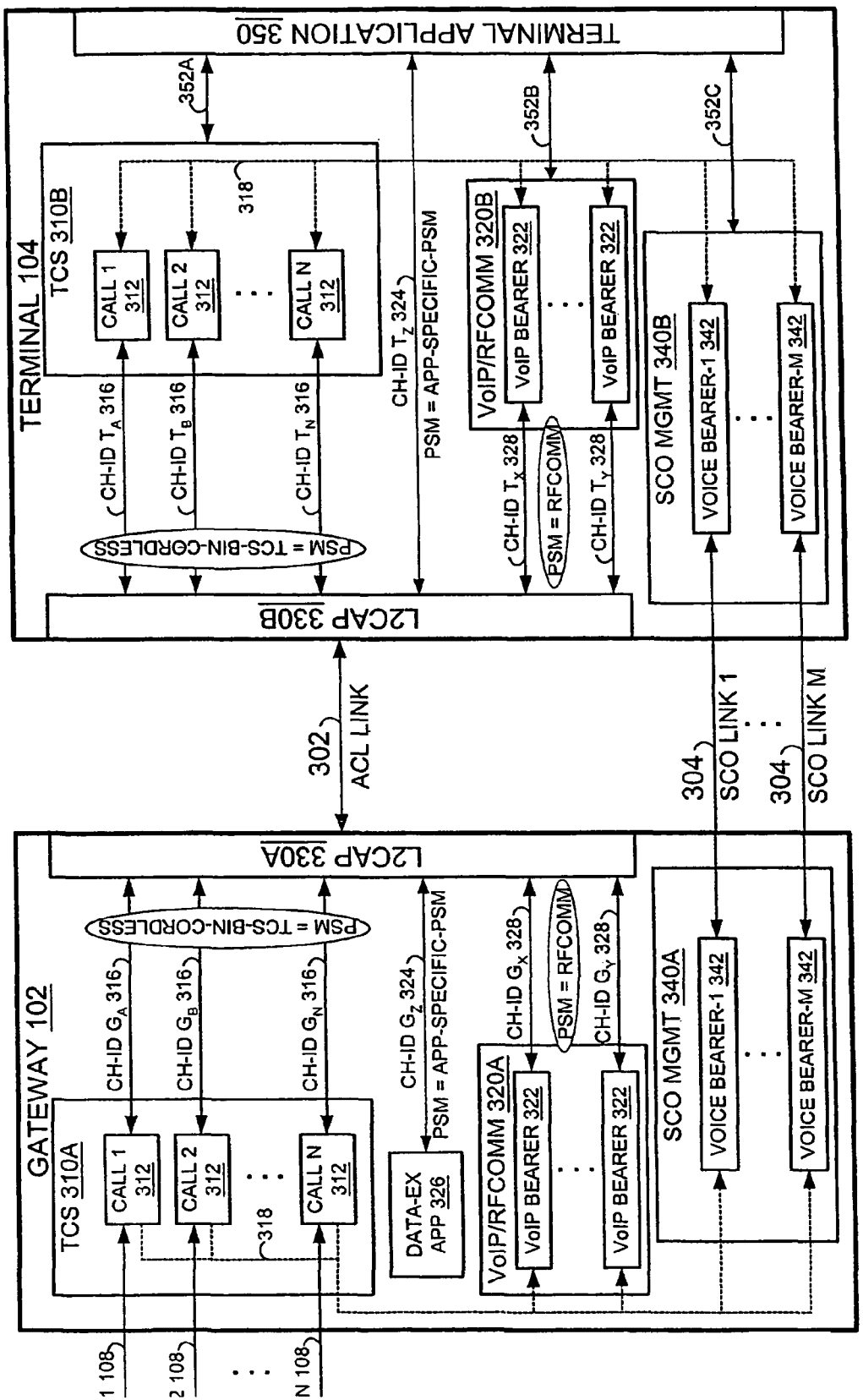
FIG. 3 depicts a gateway and an example terminal device in greater detail according to an example embodiment of the present invention.

The operations depicted in FIG. 2 are described in greater detail below according to various example embodiments of the present invention. These operations will be described in conjunction with FIG. 3, which depicts gateway 102 and an example terminal device 104 in greater detail according to an example embodiment of the present invention. As shown in FIG. 3, gateway 102 and terminal device 104 both include a TCS layer 310 (shown as 310A and 310B, respectively), an RF communications protocol (RFCOMM) 320 (shown as 320A and 320B, respectively), a Logical Link Control and Adaptation Protocol (L2CAP) layer 330 (shown as 330A and 330B, respectively), and a SCO management module 340 (shown as 340A and 340B, respectively). These components are described in greater detail below.

Terminal device 104 also includes a terminal application 350. Terminal application 350 represents the software that controls the operation of the other components within terminal device 104, manipulates the data exchanged over wireless link 110, and other necessary functions that would be apparent to those skilled in the art. These interactions with TCS 310B, RFCOMM 320B, and SCO management module 340B are depicted as lines 352A, 352B, and 352C respectively. Lines 352A represent control information and data flowing from terminal application 350 to the other components, and data flowing in the opposite direction.

Figure 4:
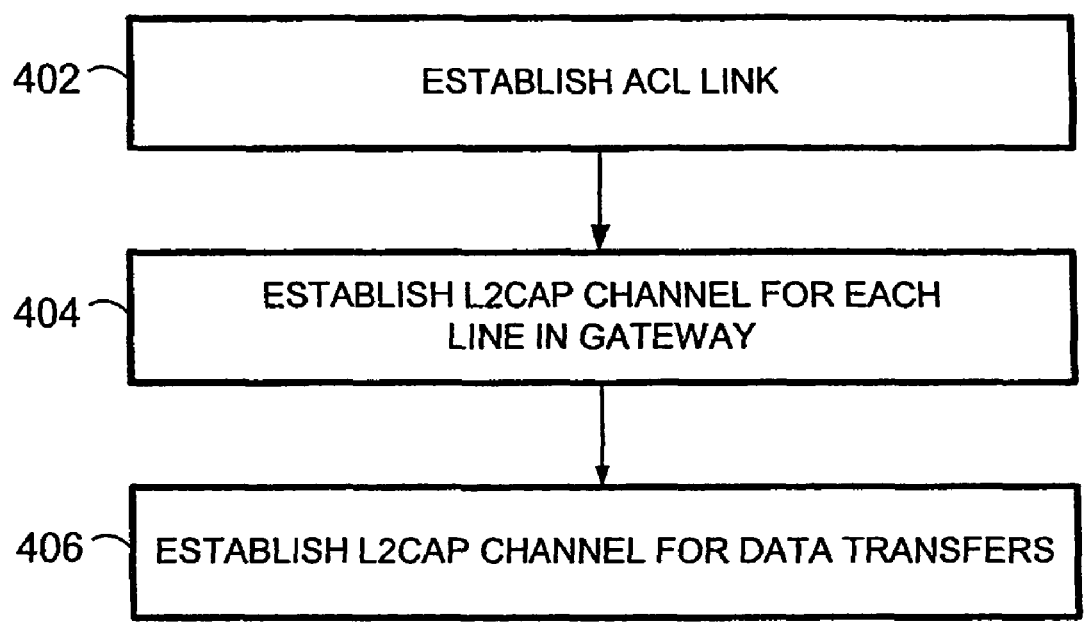
FIG. 4 depicts the operation of establishing an ACL link and one or more logical channels in greater detail according to an example embodiment of the present invention.

FIG. 4 depicts the operation of establishing an ACL link and logical channels (operation 202) in greater detail according to an example embodiment of the present invention. In operation 402, an ACL link 302 is established between gateway 102 and terminal device 104. As described above, ACL link 302 can be established upon terminal 104 coming within range of gateway 102. ACL link 302 provides a packet-switched connection between gateway 102 and all of the terminal devices 104 within piconet 130. According to the BT specification, only a single ACL link can exist between a given master and slave. In the cordless telephony environment, only one ACL link 302 can exist between gateway 102 (the piconet master) and each terminal device 104 (the piconet slaves).

In operation 404, an L2CAP channel 316 is established for each line 108 connecting gateway 102 and external network 106. As described in the BT specification, L2CAP layer 330 provides for the creation of logical channels that are used for all TCS control signaling. L2CAP channels 316 can be either connection-oriented or connectionless. Connection-oriented L2CAP channels are for point-to-point signaling between two devices, whereas connectionless L2CAP channels are for point-to-multipoint broadcast signaling from the master to all slave devices. L2CAP channels 316 as used herein refer to connection-oriented channels unless indicated otherwise.

Each one of the end-points of an L2CAP channel 316 is referred to by a channel identifier (CID). CIDs are local names representing a logical channel end-point on the device. As shown in FIG. 3, L2CAP channels 316 have CIDs on the gateway side given by CH-ID $G_A$ through CH-ID $G_N$, and on the terminal-side given by CH-ID $T_A$ through CH-ID $T_N$.

According to the CTP, terminal device 104 establishes a single L2CAP channel 316 to be used for all TCS signaling. However, having only a single L2CAP channel 316 does not allow terminal 104 to handle multiple calls because terminal 104 has no way to associate signaling information received via the channel with a particular call. According to the present invention, multiple L2CAP channels 316 are established to be used for TCS signaling, where each call is assigned its own L2CAP channel 316. So, in operation 404, terminal device 104 establishes multiple L2CAP channels 316 that are assigned CIDs selected from the pool of available CIDs.

According to a first example embodiment of the present invention, an L2CAP channel 316 is established for each line 108 connecting gateway 102 and network 106. Sufficient signaling resources are therefore always available, even if a call is being handled simultaneously on every line 108. This example embodiment is depicted in FIGS. 3 and 4, wherein a call 312 (shown as call 1 through call N) on each line 108 is assigned its own L2CAP channel 316. Call 312 can represent an incoming or outgoing call between terminal device 104 and network 106. Call 312 can also represent an intercom call between gateway 102 and terminal device 104.

However, according to other example embodiments of the present invention, the number of L2CAP channels 316 established in operation 404 need not equal the number of lines 108. Fewer L2CAP channels 316 might be established if, for example, resources are to be conserved. Conversely, additional L2CAP channels 316 might be established, for example, to support an intercom call between gateway 102 and terminal 104.

In operation 406, another L2CAP channel 324 is established for transferring data between terminal 104 and gateway 102. In the example depicted in FIG. 3, a data exchange application 326 represents software that stores the data in gateway 102 that is of interest to terminal device 104, and causes the data to be transferred upon request to terminal 104. This data transfer from data exchange application 326 to terminal application 350 occurs via L2CAP channel 324 having a gateway-side CID shown as CH-ID $G_Z$ and a terminal-side CID shown as CH-ID $T_Z$.

According to an example embodiment of the present invention, L2CAP channel 324 is established once terminal device 104 comes within range of gateway 102 along with the other L2CAP channels. L2CAP channel 324 is therefore ready in the event that a data transfer is initiated. However, according to other example embodiments of the present invention, L2CAP channel 324 may not be established until it is needed. Alternatively, L2CAP channel 324 may not be established at all if such data transfers are not supported by the particular application.

As shown in FIG. 3, L2CAP 330 performs protocol multiplexing according to the particular Protocol/Service Multiplexor (PSM) assigned to a given L2CAP channel. The PSM value identifies the particular protocol with which an L2CAP channel is associated. For example, all L2CAP channels 316 have a PSM equal to TCS-BIN-CORDLESS and are therefore routed to TCS 310. L2CAP channel 324 has an PSM equal to APP-SPECIFIC-PSM and is routed to data exchange application 326.

Figure 5:
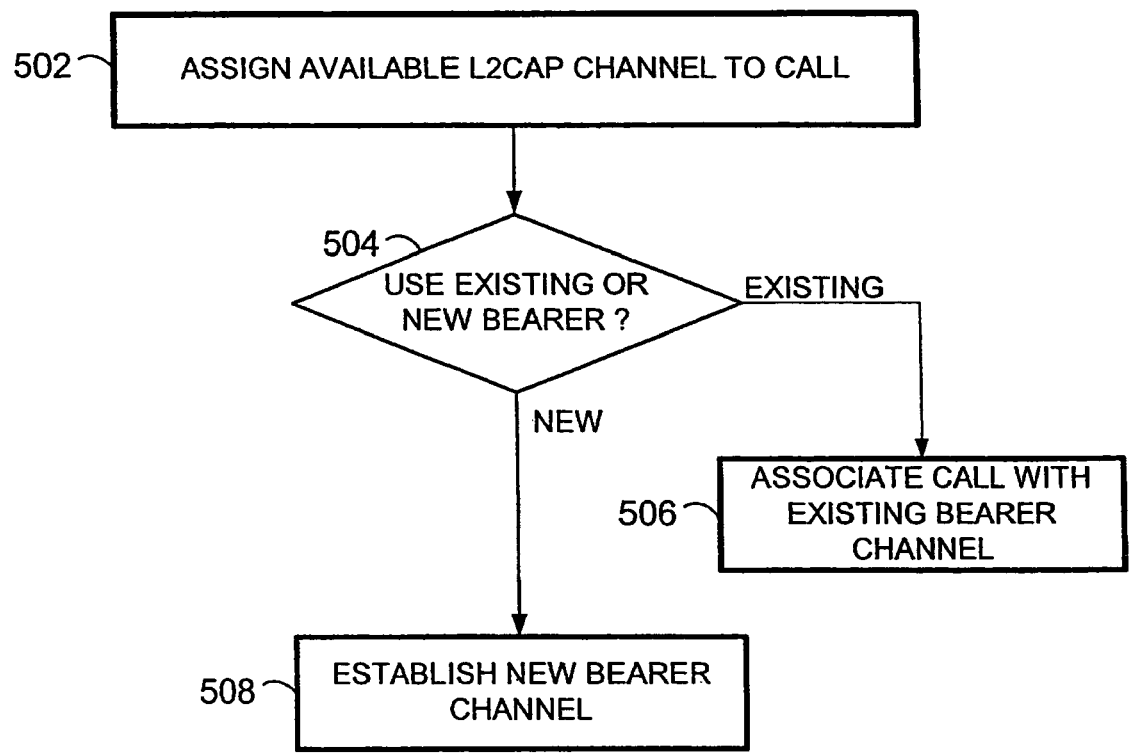
FIG. 5 depicts the operation of carrying out a call according to an example embodiment of the present invention.

Returning now to FIG. 2, ACL link 302, L2CAP channels 316, and L2CAP channel 324 (if desired) are established in operation 202. As described above, when incoming or outgoing calls 312 are set-up on a line 108, the call is carried out in operation 206. FIG. 5 depicts this operation in greater detail according to an example embodiment of the present invention. In operation 502, an available L2CAP channel 316 is assigned to the call 312. The assigned L2CAP channel 316 will carry all TCS call signaling associated with the call 312. For example, in FIG. 3, call I is assigned the L2CAP channel 316 having a CID of CH-ID $G_A$. Terminal 104 therefore knows that all TCS signaling information received over L2CAP channel 316 having a CID of CH-ID $T_A$ is associated with call 1.

According to an example embodiment of the present invention, the assignment of L2CAP channels 316 to calls 312 is done dynamically as the calls appear on lines 108. Once the L2CAP channels 316 are established in operation 202, they remain unassigned until the first call 312 is set up, at which point one of the L2CAP channels is assigned to the call. The L2CAP channel 316 is then released when the call 312 is completed. In this manner, L2CAP channels 316 act as signaling resources for calls 312 that are assigned dynamically as needed. Dynamic assignment is particularly applicable to those example embodiments wherein there are fewer L2CAP channels 316 than there are lines 108. In these example embodiments, calls 312 cannot be set up until an L2CAP channel 316 becomes available. However, according to other example embodiments of the present invention, L2CAP channels 316 may be assigned in a static fashion.

In operation 504, a determination is made whether to use an existing bearer channel, or to establish a new bearer channel for the call. If an existing bearer channel is available, in operation 506 the call is associated with the available bearer channel and the call proceeds under the control of the assigned L2CAP signaling channel 316. Otherwise a new bearer channel is established in operation 508 and associated with the call so that the call can proceed under the control of the assigned L2CAP signaling channel 316. In some situations, examples of which are described below, multiple calls 312 can share the same bearer channel.

Different types of channels can be used as bearer channels of the voice signal associated with a call. Two types are described herein: SCO links and L2CAP channels carrying VoIP data. As described above, SCO links are point-to-point links between a master and a slave that support real-time voice traffic. SCO links are therefore often used as bearer channels. As shown in FIG. 3, SCO management module 340 can include one or more voice bearers 342 associated with SCO links 304. The maximum number of SCO links 304 (shown as M in FIG. 3) may be limited by the communication protocol. According to the current version of the BT specification, a master device can support up to three SCO links to the same slave or to different slaves. A slave device can support up to three SCO links from the same master, or two SCO links if the links originate from different masters.

L2CAP channels can also be used as bearer channels for calls 312 using VoIP techniques. As shown in FIG. 3, one or more VoIP bearers 322 can be established within RFCOMM 320 for exchanging VoIP data over an L2CAP bearer channel 328. RFCOMM 320 represents a protocol that provides emulation of serial ports over L2CAP 330. RFCOMM 320 utilizes a VoIP application (not shown) to generate the VoIP packetized data from the voice signal associated with a call. The L2CAP bearer channels 328 can be established at the same time the other L2CAP signaling channels are established. Alternatively, L2CAP bearer channels 328 can be created as needed. VoIP bearers 322 can be used, for example, if a call 312 needs to be set up and the maximum number of SCO links 304 has been reached.

Both SCO bearers 342 and VoIP bearers 322 operate under the control of the TCS signaling on the L2CAP channel 316 assigned to the call 312. This control relationship is depicted as control path 318 in FIG. 3, connecting calls 312 to VoIP bearers 322 and voice bearers 342.

Figure 6:
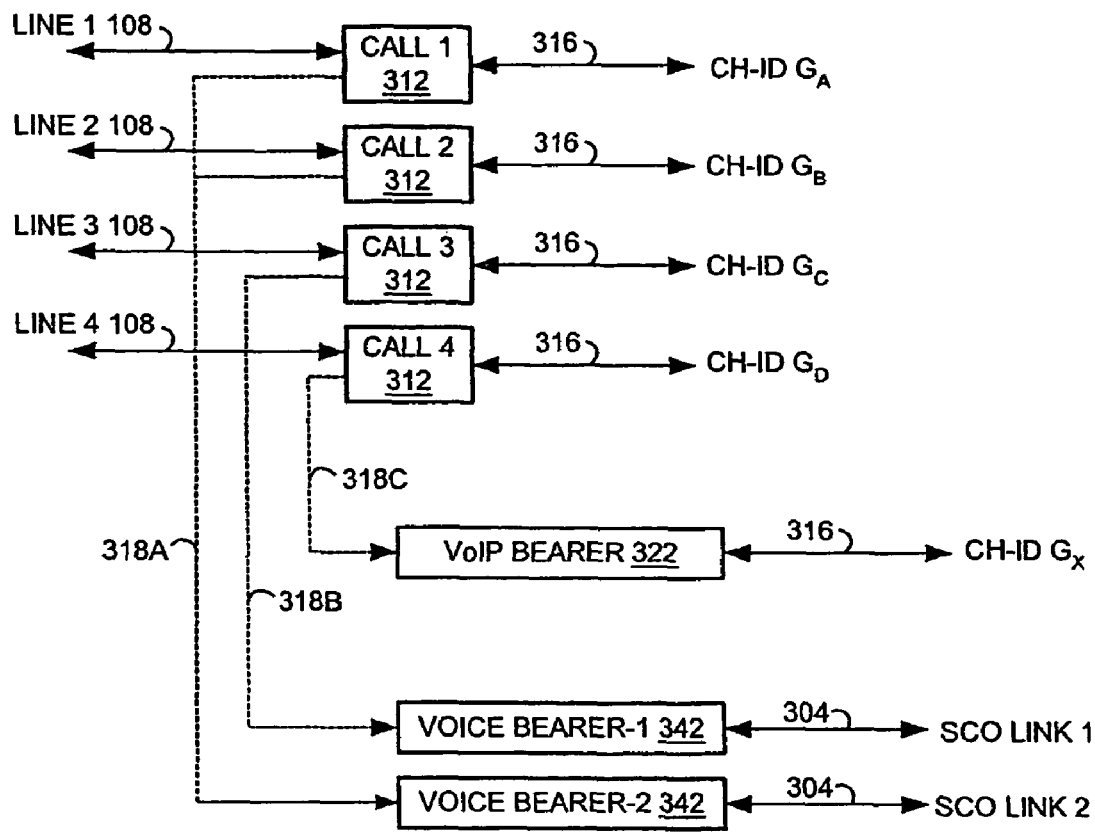
FIG. 6 depicts an example association between calls, logical channels, and bearer channels according to an example embodiment of the present invention.

According to the present invention, a flexible framework is employed wherein different types of bearer channels can be freely associated with different calls. FIG. 6 depicts an example association of calls 312, VoIP bearers 322, and voice bearers 342. As shown in FIG. 6, for example, the voice signal for call 3 is assigned to voice bearer 1. Voice bearer 1 therefore operates under the control of the TCS signaling on the L2CAP channel having a channel ID of CH-ID $G_C$ on the gateway side and CH-ID $T_C$ on the terminal side. This control relationship is depicted as control path 318B. Similarly, the voice signal for call 4 can be assigned to a VoIP bearer that operates under the control of the L2CAP channel having a channel ID of CH-ID $G_D$ on the gateway side and CH-ID $T_D$ on the terminal side. The architecture therefore supports the concurrent use of different types of bearer channels.

Multiple calls 312 can also be associated with the same bearer channel. For example, when a first call is put on hold, a second call can use the bearer channel assigned to the first call. Also, certain applications may support conference calling where the voice signals from several calls share a common bearer channel. As shown in FIG. 6, for example, calls 1 and 2 share voice bearer 2. Voice bearer 2 therefore operates under the shared control of the TCS signaling on the L2CAP channels associated with calls 1 and 2.

Returning now to FIG. 2, if data transfers are initiated in operation 208, the data transfer is carried out in operation 210. Data transfers can be initiated in various ways such as, for example, by user request at terminal device 104. Data transfers might also be initiated automatically to insure that terminal device 104 is periodically refreshed with the latest stored data 326. As described above, data is transferred between gateway 102 and terminal device 104 using L2CAP channel 324.

Gateway 102 and terminals 104 are configured to be interoperable with conventional devices whose operation does not extend beyond the CTP protocol. For example, when a conventional CTP terminal device comes in contact with gateway 102 configured according to the present invention, gateway 102 sets up a single L2CAP channel 316 and carries out only one call at a time. Gateway 102 can allocate any available line 108 when terminal device 104 requests an outgoing call. Further, gateway 102 can handle calls 312 on multiple lines 108, but only so long as the calls do not occur simultaneously. However, gateway 102 cannot perform data transfers with a conventional CTP terminal device.

As another example, when a terminal device 104 configured according to the present invention comes in contact with a conventional single-line gateway, the terminal's requests to establish multiple L2CAP channels 316 will likely fail. Terminal device 104 can infer from this failure that the gateway does not support multiple lines. Similarly, a request from terminal device 104 to establish an L2CAP channel 324 for data transfers will also likely fail, causing the terminal to infer that the gateway does not support the data transfer feature.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is

1. A method comprising:
    (a) establishing a plurality of logical channels between a terminal and a gateway, wherein each logical channel comprises a channel identifier that represents a logical channel end point; and
    (b) associating a first logical channel of the plurality of logical channels with a first bearer channel that carries a first call, wherein all and only signaling information for the first call is configured to be transmitted over the first logical channel, and wherein a first voice signal is configured to be carried over the first bearer channel; and
    (c) associating a second logical channel of the plurality of logical channels with a second bearer channel that carries a second call, wherein all and only signaling information for the second call is configured to be transmitted over the second logical channel, and wherein a second voice signal is configured to be carried over the second bearer channel,
    wherein one of the first or second bearer channels includes a synchronous channel.

2. The method of claim 1, wherein the method further comprises:
    (d) associating a third logical channel of the plurality of logical channels with an asynchronous channel that accesses data from said gateway.

3. The method of claim 1, wherein one of the first or second bearer channels includes an asynchronous channel.

4. The method of claim 1, wherein one or both of the first and/or second bearer channels carries voice over IP (VoIP) data.

5. The method of claim 1, wherein said gateway is coupled to a network via a plurality of lines, and wherein said first call is carried on one of said plurality of lines.

6. The method of claim 5, wherein said network comprises a public switched telephone network (PSTN).

7. A system comprising:
    a terminal for establishing a plurality of logical channels, wherein each logical channel comprises a channel identifier that represents a logical channel end point; and
    a gateway, coupled to said plurality of logical channels, dynamically assigning at least two logical channels in said plurality of logical channels to calls as the calls are set up between said gateway and said terminal,
    wherein one or both of said terminal or said gateway associates a first logical channel of the plurality of logical channels with a first bearer channel that carries a first call, wherein all and only signaling information for the first call is configured to be transmitted over the first logical channel, and wherein a first voice signal is configured to be carried over the first bearer channel,
    wherein one or both of said terminal or said gateway associates a second logical channel of the plurality of logical channels with a second bearer channel that carries a second call, wherein all and only signaling information for the second call is configured to be transmitted over the second logical channel, and wherein a second voice signal is configured to be carried over the second bearer channel,
    wherein one of the first or second bearer channels includes a synchronous channel.

8. The system of claim 7, wherein said gateway is coupled to a network via a plurality of lines.

9. The system of claim 7, wherein said gateway further associates another logical channel with an asynchronous channel that accesses data from said gateway.

10. The system of claim 7, wherein at least one of the bearer channels includes an asynchronous channel.

11. The system of claim 7, wherein at least one of the bearer channels carries voice over IP (VOIP) data.

12. At least one non-transitory computer readable media having stored thereon code for supporting communication between a gateway and a terminal, the code operable to cause performance of the operations comprising:
    (a) establishing a plurality of logical channels between a terminal and a gateway, wherein each logical channel comprises a channel identifier that represents a logical channel end point;.
    (b) dynamically assigning and associating a first logical channel of the plurality of logical channels with a first bearer channel that carries a first call as the first call is set up, wherein all and only signaling information for the first call is configured to be transmitted over the first logical channel, and wherein a first voice signal is configured to be carried over the first bearer channel; and (c) dynamically assigning and associating a second logical channel of the plurality of logical channels with a second bearer channel that carries a second call as the second call is set up, wherein all and only signaling information for the second call is configured to be transmitted over the second logical channel, and wherein a second voice signal is configured to be carried over the second bearer channel, wherein one of the first or second bearer channel includes a synchronous channel.

13. A system comprising:

an integrated circuit for use in a terminal, said terminal for establishing a plurality of logical channels, wherein each logical channel comprises a channel identifier that represents a logical channel end point, and wherein said terminal communicates with a gateway, said gateway configured to dynamically assign at least two logical channels in said plurality of logical channels to calls as the calls are set up between said gateway and said terminal, wherein one or both of said terminal or said gateway associates a first logical channel of the plurality of logical channels with a first bearer channel that carries a first call, wherein all and only signaling information for the first call is configured to be transmitted over the first logical channel, and wherein a first voice signal is configured to be carried over the first bearer channel, wherein one or both of said terminal or said gateway associates a second logical channel of the plurality of logical channels with a second bearer channel that carries a second call, wherein all and only signaling information for the second call is configured to be transmitted over the second logical channel, and wherein a second voice signal is configured to be carried over the second bearer channel, wherein one of the first or second bearer channels includes a synchronous channel.

14. The system of claim 13, wherein said gateway is coupled to a network via a plurality of lines.

15. The system of claim 13, wherein said gateway further associates another logical channel with an asynchronous channel that accesses data from said gateway.

16. The system of claim 13, wherein at least one of the bearer channels includes an asynchronous channel.

17. The system of claim 13, wherein at least one of the bearer channels carries voice over IP (VoIP) data.

* * * * *